(12) United States Patent
Sugi et al.

(10) Patent No.: US 7,924,685 B2
(45) Date of Patent: Apr. 12, 2011

(54) OBJECTIVE LENS

(75) Inventors: Yasuyuki Sugi, Ibaraki (JP); Mitsuhiro Miyauchi, Ibaraki (JP); Mitsuru Ito, Ibaraki (JP); Naofumi Ueda, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 261 days.

(21) Appl. No.: 12/379,797

(22) Filed: Mar. 2, 2009

(65) Prior Publication Data
US 2009/0225643 A1    Sep. 10, 2009

(30) Foreign Application Priority Data

Mar. 5, 2008    (JP) ................................ 2008-054489

(51) Int. Cl.
*G11B 7/135* (2006.01)
(52) U.S. Cl. .................................. 369/112.23
(58) Field of Classification Search ............. 369/112.23, 369/112.01, 112.05, 44.32; 359/708–719, 359/642
See application file for complete search history.

(56) References Cited

U.S. PATENT DOCUMENTS

| | | | | |
|---|---|---|---|---|
| 6,807,018 | B2 * | 10/2004 | Maruyama et al. | 359/719 |
| 7,508,596 | B2 * | 3/2009 | Saito | 359/719 |
| 2002/0186476 | A1 * | 12/2002 | Sasano et al. | 359/719 |
| 2006/0198254 | A1 * | 9/2006 | Hirai et al. | 369/44.13 |
| 2007/0104045 | A1 * | 5/2007 | Nagura | 369/44.23 |

FOREIGN PATENT DOCUMENTS

JP    A-2008-4169    1/2008

* cited by examiner

*Primary Examiner* — Joseph Haley
*Assistant Examiner* — Nicholas Lee
(74) *Attorney, Agent, or Firm* — Oliff & Berridge, PLC

(57) ABSTRACT

An object of the invention is to provide a plastic objective lens having a good lens tilt property in both thicknesses of a two-layer disc in a used temperature range even in the plastic objective lens in which a numerical aperture (NA) is equal to or higher than 0.81, while dissolving the problem mentioned above. The objective lens includes a point at which a third order comma aberration amount generated at a time of a lens tilt of the objective lens becomes equal to a third order comma aberration amount generated at a time when a disc is tilted at the same angle amount as the lens tilt angle, in a transparent board thickness which is thicker than a larger thickness of the two-layer transparent board under a room temperature (25±3° C.).

4 Claims, 11 Drawing Sheets

FIG.4

LENS DATA OF COMPARATIVE EXAMPLE, THICKNESS OF TRANSPARENT BOARD =0.0875 mm, OBJECT DISTANCE = INFINITY, TEMPERATURE 25 °C

| SURFACE | RADIUS OF CURVATURE (mm) | FACE-TO-FACE DISTANCE (mm) | REFRACTIVE INDEX |
|---|---|---|---|
| OBJECT | Infinity | Infinity | |
| APERTURE | Infinity | 0 | |
| OBJECTIVE LENS LIGHT SOURCE SIDE SURFACE | 0.906835† | 1.666 | 1.53 |
| OBJECTIVE LENS DISC SIDE SURFACE | -1.555559 | 0.4593 | |
| DISC SURFACE | Infinity | 0.0875 | 1.62 |
| IMAGE SURFACE | Infinity | | |

| ASPHERIC FACTOR OF OBJECTIVE LENS LIGHT SOURCE SIDE SURFACE | |
|---|---|
| K | -0.5396667 |
| A4 | 0.00996924 |
| A6 | -0.001710195 |
| A8 | 0.018032294 |
| A10 | -0.033266239 |
| A12 | 0.041799179 |
| A14 | -0.026400531 |
| A16 | 0.006506096 |

| ASPHERIC FACTOR OF OBJECTIVE LENS DISC SIDE SURFACE | |
|---|---|
| K | -31.40326 |
| A4 | 0.30262442 |
| A6 | -0.56898579 |
| A8 | 0.56209521 |
| A10 | 0.014931876 |
| A12 | -0.64966985 |
| A14 | 0.61631243 |
| A16 | -0.1920794 |

APERTURE DIAMETER = φ2.4 mm

SPHERICAL ABERRATION PROPERTY (FIELD ANGLE 0 DEGREE)

| TOTAL = | 0.0005168 λ rms |
|---|---|
| SA3 = | 0.0000087 λ rms |
| SA5 = | 0.0000823 λ rms |
| SA7 = | 0.0000186 λ rms |
| SA9 = | 0.0001344 λ rms |

FIELD ANGLE PROPERTIES OF ASTIGMATISM AND COMMA ABERRATION UNDER FIELD ANGLE 0.3 DEGREE

| AS3 = | -0.0043783 λ rms |
|---|---|
| COMA3 = | -0.0000035 λ rms |

LENS TILT PROPERTIES OF ASTIGMATISM AND COMMA ABERRATION UNDER LENS TILT ANGLE 0.3 DEGREE

| AS3 = | -0.0040016 λ rms |
|---|---|
| COMA3 = | -0.0266347 λ rms |

DISC TILT PROPERTIES OF ASTIGMATISM AND COMMA ABERRATION UNDER DISC TILT ANGLE 0.3 DEGREE

| AS3 = | 0.0002407 λ rms |
|---|---|
| COMA3 = | 0.0285179 λ rms |

FIG.5

LENS DATA OF COMPARATIVE EXAMPLE, THICKNESS OF TRANSPARENT BOARD = 0.100 mm, OBJECT DISTANCE = 338.9928 mm, TEMPERATURE 25 °C

| SURFACE | RADIUS OF CURVATURE [mm] | FACE-TO-FACE DISTANCE [mm] | REFRACTIVE INDEX |
|---|---|---|---|
| OBJECT | Infinity | 338.9928 | |
| APERTURE | Infinity | 0 | |
| OBJECTIVE LENS LIGHT SOURCE SIDE SURFACE | 0.9068351 | 1.666 | 1.53 |
| OBJECTIVE LENS DISC SIDE SURFACE | -1.555559 | 0.4574 | |
| DISC SURFACE | INFINITY | 0.1 | 1.62 |
| IMAGE SURFACE | INFINITY | | |

APERTURE DIAMETER = φ2.4 mm

| ASPHERIC FACTOR OF OBJECTIVE LENS LIGHT SOURCE SIDE SURFACE | | |
|---|---|---|
| K | -0.5396667 | |
| A4 | 0.00996924 | |
| A6 | -0.001710195 | |
| A8 | 0.018032294 | |
| A10 | -0.033266239 | |
| A12 | 0.041799179 | |
| A14 | -0.026400531 | |
| A16 | 0.006506096 | |

| ASPHERIC FACTOR OF OBJECTIVE LENS DISC SIDE SURFACE | | |
|---|---|---|
| K | -31.40326 | |
| A4 | 0.30282442 | |
| A6 | -0.56898579 | |
| A8 | 0.58208521 | |
| A10 | 0.014931876 | |
| A12 | -0.84968985 | |
| A14 | 0.61631243 | |
| A16 | -0.1920794 | |

SPHERICAL ABERRATION PROPERTY (FIELD ANGLE 0 DEGREE)

| TOTAL = | 0.0061785 λ rms |
|---|---|
| SA3 = | -0.0020650 λ rms |
| SA5 = | -0.0056256 λ rms |
| SA7 = | -0.0019418 λ rms |
| SA9 = | -0.0004184 λ rms |
| DEVIATION= | 0.0005745 λ rms |

FIELD ANGLE PROPERTIES OF ASTIGMATISM AND COMA ABERRATION (FIELD ANGLE 0.3 DEGREE)

| AS3 = | -0.0046126 λ rms |
|---|---|
| COMA3 = | 0.01099727 λ rms |

FIG.6

LENS DATA OF COMPARATIVE EXAMPLE, THICKNESS OF TRANSPARENT BOARD = 0.075 mm, OBJECT DISTANCE = -323.9408 mm, TEMPERATURE 25 °C

| SURFACE | RADIUS OF CURVATURE (mm) | FACE-TO-FACE DISTANCE (mm) | REFRACTIVE INDEX |
|---|---|---|---|
| OBJECT | Infinity | -323.9406 | |
| APERTURE | Infinity | 0 | APERTURE DIAMETER = φ2.4 mm |
| OBJECTIVE LENS LIGHT SOURCE SIDE SURFACE | 0.9068351 | 1.666 | 1.53 |
| OBJECTIVE LENS DISC SIDE SURFACE | -1.555559 | 0.4609 | |
| DISC SURFACE | Infinity | 0.075 | 1.62 |
| IMAGE SURFACE | Infinity | | |

| ASPHERIC FACTOR OF OBJECTIVE LENS LIGHT SOURCE SIDE SURFACE | K | -0.5398667 |
|---|---|---|
| | A4 | 0.00996924 |
| | A6 | -0.001710195 |
| | A8 | 0.018032294 |
| | A10 | -0.033268239 |
| | A12 | 0.041799179 |
| | A14 | -0.026400531 |
| | A16 | 0.005506096 |

| ASPHERIC FACTOR OF OBJECTIVE LENS DISC SIDE SURFACE | K | -31.40328 |
|---|---|---|
| | A4 | 0.302282442 |
| | A6 | -0.568888579 |
| | A8 | 0.562095211 |
| | A10 | 0.014931876 |
| | A12 | -0.649968985 |
| | A14 | 0.816631243 |
| | A16 | -0.19207940 |

SPHERICAL ABERRATION PROPERTY (FIELD ANGLE 0 DEGREE)

| TOTAL = | 0.0062521 λ rms |
|---|---|
| SA3 = | 0.0023146 λ rms |
| SA5 = | 0.0057297 λ rms |
| SA7 = | 0.0015548 λ rms |
| SA9 = | 0.0008338 λ rms |
| DEVIATION= | 0.0005003 λ rms |

FIELD ANGLE PROPERTIES OF ASTIGMATISM AND COMMA ABERRATION (FIELD ANGLE 0.3 DEGREE)

| AS3 = | -0.0041470 λ rms |
|---|---|
| COMA3 = | -0.0110761 λ rms |

FIG.7

LENS DATA OF COMPARATIVE EXAMPLE, TIME WHEN TEMPERATURE RISES AT 30 °C,
THICKNESS OF TRANSPARENT BOARD = 0.100 mm, OBJECT DISTANCE = 163.3295 mm, TEMPERATURE 55 °C

| SURFACE | RADIUS OF CURVATURE (mm) | FACE-TO-FACE DISTANCE (mm) | REFRACTIVE INDEX |
|---|---|---|---|
| OBJECT | Infinity | 163.3295 | |
| APERTURE | Infinity | 0 | |
| OBJECTIVE LENS LIGHT SOURCE SIDE SURFACE | 0.9068351 | 1.666 | 1.5267 |
| OBJECTIVE LENS DISC SIDE SURFACE | -1.555559 | 0.4698 | |
| DISC SURFACE | Infinity | 0.1 | 1.6167 |
| IMAGE SURFACE | Infinity | | |

| ASPHERIC FACTOR OF OBJECTIVE LENS LIGHT SOURCE SIDE SURFACE | |
|---|---|
| K | -0.5396667 |
| A4 | 0.009996824 |
| A6 | -0.001710195 |
| A8 | 0.018032294 |
| A10 | -0.033266239 |
| A12 | 0.041799179 |
| A14 | -0.026400531 |
| A16 | 0.006506096 |

| ASPHERIC FACTOR OF OBJECTIVE LENS DISC SIDE SURFACE | |
|---|---|
| K | -31.40326 |
| A4 | 0.30282442 |
| A6 | -0.568998579 |
| A8 | 0.56209521 |
| A10 | 0.014931876 |
| A12 | -0.649689985 |
| A14 | 0.616631243 |
| A16 | -0.1920794 |

APERTURE DIAMETER = φ2.4 mm

| SPHERICAL ABERRATION PROPERTY (FIELD ANGLE 0 DEGREE) | |
|---|---|
| TOTAL = | 0.0258952 λ rms |
| SA3 = | -0.0069042 λ rms |
| SA5 = | -0.0233725 λ rms |
| SA7 = | -0.0106481 λ rms |
| SA9 = | -0.0032749 λ rms |

| FIELD ANGLE PROPERTIES OF ASTIGMATISM AND COMMA ABERRATION UNDER FIELD ANGLE 0.3 DEGREE | |
|---|---|
| AS3 = | -0.0049484 λ rms |
| COMA3 = | 0.0249320 λ rms |

| LENS TILT PROPERTIES OF ASTIGMATISM AND COMMA ABERRATION UNDER LENS TILT ANGLE 0.3 DEGREE | |
|---|---|
| AS3 = | -0.0044710 λ rms |
| COMA3 = | -0.0077500 λ rms |

| DISC TILT PROPERTIES OF ASTIGMATISM AND COMMA ABERRATION UNDER DISC TILT ANGLE 0.3 DEGREE | |
|---|---|
| AS3 = | 0.0002719 λ rms |
| COMA3 = | 0.0325419 λ rms |

FIG.8

LENS DATA OF FIRST EMBODIMENT OF PRESENT INVENTION, THICKNESS OF TRANSPARENT BOARD = 0.1125 mm,
OBJECT DISTANCE = 168.0415 mm, TEMPERATURE 25 °C

| SURFACE | RADIUS OF CURVATURE (mm) | FACE-TO-FACE DISTANCE (mm) | REFRACTIVE INDEX |
|---|---|---|---|
| OBJECT | Infinity | 168.0415 | |
| APERTURE | Infinity | 0 | |
| OBJECTIVE LENS LIGHT SOURCE SIDE SURFACE | 0.9125508 | 1.866 | 1.53 |
| OBJECTIVE LENS DISC SIDE SURFACE | -1.527477 | 0.461368833 | |
| DISC SURFACE | Infinity | 0.1125 | 1.62 |
| IMAGE SURFACE | Infinity | | |

| ASPHERIC FACTOR OF OBJECTIVE LENS LIGHT SOURCE SIDE SURFACE | | |
|---|---|---|
| | K | -0.5434488 |
| | A4 | 0.008477277 |
| | A6 | -0.00210783 |
| | A8 | 0.017645155 |
| | A10 | -0.033434871 |
| | A12 | 0.041943912 |
| | A14 | -0.027249495 |
| | A16 | 0.008846963 |

| ASPHERIC FACTOR OF OBJECTIVE LENS DISC SIDE SURFACE | | |
|---|---|---|
| | K | -27.39035 |
| | A4 | 0.28490137 |
| | A6 | -0.55741718 |
| | A8 | 0.55700006 |
| | A10 | -0.006723467 |
| | A12 | -0.58517846 |
| | A14 | 0.549107112 |
| | A16 | -0.167484428 |

APERTURE DIAMETER = φ2.4 mm

SPHERICAL ABERRATION PROPERTY
(FIELD ANGLE 0 DEGREE)

| TOTAL = | 0.0006284 λ rms |
|---|---|
| SA3 = | -0.0003332 λ rms |
| SA5 = | 0.0000965 λ rms |
| SA7 = | 0.0005543 λ rms |
| SA9 = | 0.0001714 λ rms |

FIELD ANGLE PROPERTIES OF ASTIGMATISM AND COMMA ABERRATION UNDER FIELD ANGLE 0.3 DEGREE

| AS3 = | -0.0042876 λ rms |
|---|---|
| COMA3 = | -0.0001599 λ rms |

LENS TILT PROPERTIES OF ASTIGMATISM AND COMMA ABERRATION UNDER LENS TILT ANGLE 0.3 DEGREE

| AS3 = | -0.0038234 λ rms |
|---|---|
| COMA3 = | -0.0380326 λ rms |

DISC TILT PROPERTIES OF ASTIGMATISM AND COMMA ABERRATION UNDER DISC TILT ANGLE 0.3 DEGREE

| AS3 = | 0.0003058 λ rms |
|---|---|
| COMA3 = | 0.0357630 λ rms |

FIG.9

LENS DATA OF FIRST EMBODIMENT OF PRESENT INVENTION, THICKNESS OF TRANSPARENT BOARD = 0.075 mm, OBJECT DISTANCE = -272.8153 mm, TEMPERATURE 25 °C

| SURFACE | RADIUS OF CURVATURE (mm) | FACE-TO-FACE DISTANCE (mm) | REFRACTIVE INDEX |
|---|---|---|---|
| OBJECT | Infinity | -272.8153 | |
| APERTURE | Infinity | 0 | |
| OBJECTIVE LENS LIGHT SOURCE SIDE SURFACE | 0.9125508 | 1.696 | 1.53 |
| OBJECTIVE LENS DISC SIDE SURFACE | -1.527477 | 0.465645455 | |
| DISC SURFACE | Infinity | 0.075 | 1.62 |
| IMAGE SURFACE | Infinity | | |

| ASPHERIC FACTOR OF OBJECTIVE LENS LIGHT SOURCE SIDE SURFACE | |
|---|---|
| K | -0.5434488 |
| A4 | 0.008477277 |
| A6 | -0.00210783 |
| A8 | 0.017645155 |
| A10 | -0.033434971 |
| A12 | 0.041943912 |
| A14 | -0.027249495 |
| A16 | 0.006846963 |

| ASPHERIC FACTOR OF OBJECTIVE LENS DISC SIDE SURFACE | |
|---|---|
| K | -27.39035 |
| A4 | 0.29490137 |
| A6 | -0.55741718 |
| A8 | 0.55700006 |
| A10 | -0.006723467 |
| A12 | -0.58517848 |
| A14 | 0.54910712 |
| A16 | -0.16746428 |

APERTURE DIAMETER = φ2.4 mm

| SPHERICAL ABERRATION PROPERTY (FIELD ANGLE 0 DEGREE) | |
|---|---|
| TOTAL = | 0.0197665 λ rms |
| SA3 = | 0.0082587 λ rms |
| SA5 = | 0.0179204 λ rms |
| SA7 = | 0.0041315 λ rms |
| SA9 = | 0.0012677 λ rms |

| FIELD ANGLE PROPERTIES OF ASTIGMATISM AND COMMA ABERRATION UNDER FIELD ANGLE 0.3 DEGREE | |
|---|---|
| AS3 = | -0.0036201 λ rms |
| COMA3 = | -0.0327636 λ rms |

| LENS TILT PROPERTIES OF ASTIGMATISM AND COMMA ABERRATION UNDER LENS TILT ANGLE 0.3 DEGREE | |
|---|---|
| AS3 = | -0.0033660 λ rms |
| COMA3 = | -0.0580930 λ rms |

| DISC TILT PROPERTIES OF ASTIGMATISM AND COMMA ABERRATION UNDER DISC TILT ANGLE 0.3 DEGREE | |
|---|---|
| AS3 = | 0.0002030 λ rms |
| COMA3 = | 0.0232293 λ rms |

FIG. 10

LENS DATA OF FIRST EMBODIMENT OF PRESENT INVENTION, THICKNESS OF TRANSPARENT BOARD = 0.100 mm, OBJECT DISTANCE = 151.1078 mm, TEMPERATURE 55 °C

| SURFACE | RADIUS OF CURVATURE (mm) | FACE-TO-FACE DISTANCE (mm) | REFRACTIVE INDEX |
|---|---|---|---|
| OBJECT | Infinity | 151.1078 | |
| APERTURE | Infinity | 0 | |
| OBJECTIVE LENS LIGHT SOURCE SIDE SURFACE | 0.9125508 | 1.666 | 1.5267 |
| OBJECTIVE LENS DISC SIDE SURFACE | -1.527477 | 0.476527893 | |
| DISC SURFACE | Infinity | 0.1 | 1.6167 |
| IMAGE SURFACE | Infinity | | |

| ASPHERIC FACTOR OF OBJECTIVE LENS LIGHT SOURCE SIDE SURFACE | |
|---|---|
| K | -0.5434488 |
| A4 | 0.008477277 |
| A6 | -0.00210783 |
| A8 | 0.017645155 |
| A10 | -0.033434971 |
| A12 | 0.041843912 |
| A14 | -0.027249495 |
| A16 | 0.006846963 |

| ASPHERIC FACTOR OF OBJECTIVE LENS DISC SIDE SURFACE | |
|---|---|
| K | -27.39035 |
| A4 | 0.29490137 |
| A6 | -0.55741718 |
| A8 | 0.55700008 |
| A10 | -0.008723467 |
| A12 | -0.58517846 |
| A14 | 0.54910712 |
| A16 | -0.16746428 |

| APERTURE DIAMETER = φ2.4 mm |
|---|

| SPHERICAL ABERRATION PROPERTY (FIELD ANGLE 0 DEGREE) | |
|---|---|
| TOTAL = | 0.0153135 λ rms |
| SA3 = | -0.0044092 λ rms |
| SA5 = | -0.0138006 λ rms |
| SA7 = | -0.0081429 λ rms |
| SA9 = | -0.0017265 λ rms |

| FIELD ANGLE PROPERTIES OF ASTIGMATISM AND COMMA ABERRATION UNDER FIELD ANGLE 0.3 DEGREE | |
|---|---|
| AS3 = | -0.0043934 λ rms |
| COMA3 = | 0.0035897 λ rms |

| LENS TILT PROPERTIES OF ASTIGMATISM AND COMMA ABERRATION UNDER LENS TILT ANGLE 0.3 DEGREE | |
|---|---|
| AS3 = | -0.0039837 λ rms |
| COMA3 = | -0.0276034 λ rms |

| DISC TILT PROPERTIES OF ASTIGMATISM AND COMMA ABERRATION UNDER DISC TILT ANGLE 0.3 DEGREE | |
|---|---|
| AS3 = | 0.0002874 λ rms |
| COMA3 = | 0.0311321 λ rms |

FIG.11

LENS DATA OF SECOND EMBODIMENT OF PRESENT INVENTION, THICKNESS OF TRANSPARENT BOARD = 0.103 mm, OBJECT DISTANCE = 300, TEMPERATURE 25 °C

| SURFACE | RADIUS OF CURVATURE (mm) | FACE-TO-FACE DISTANCE (mm) | REFRACTIVE INDEX |
|---|---|---|---|
| OBJECT | Infinity | 300 | |
| APERTURE | Infinity | 0 | |
| OBJECTIVE LENS LIGHT SOURCE SIDE SURFACE | 0.9102334 | 1.666 | 1.53 |
| OBJECTIVE LENS DISC SIDE SURFACE | -1.538624 | 0.459714535 | |
| DISC SURFACE | Infinity | 0.103 | 1.62 |
| IMAGE SURFACE | Infinity | | |

| ASPHERIC FACTOR OF OBJECTIVE LENS LIGHT SOURCE SIDE SURFACE | | |
|---|---|---|
| K | -0.5432783 | |
| A4 | 0.009330351 | |
| A6 | -0.001488119 | |
| A8 | 0.017284205 | |
| A10 | -0.033023272 | |
| A12 | 0.04218927 | |
| A14 | -0.027719578 | |
| A16 | 0.005799971 | |

| ASPHERIC FACTOR OF OBJECTIVE LENS DISC SIDE SURFACE | | |
|---|---|---|
| K | -29.11896 | |
| A4 | 0.029523857 | |
| A6 | -0.55135252 | |
| A8 | 0.545337901 | |
| A10 | -0.004393724 | |
| A12 | -0.57661172 | |
| A14 | 0.54220418 | |
| A16 | -0.16604966 | |

| APERTURE DIAMETER = φ2.4 mm | |
|---|---|

| SPHERICAL ABERRATION PROPERTY (FIELD ANGLE 0 DEGREE) | |
|---|---|
| TOTAL = | 0.0004930 λ rms |
| SA3 = | 0.0000249 λ rms |
| SA5 = | 0.0000638 λ rms |
| SA7 = | 0.0000423 λ rms |
| SA9 = | 0.0001150 λ rms |

| FIELD ANGLE PROPERTIES OF ASTIGMATISM AND COMMA ABERRATION UNDER FIELD ANGLE 0.3 DEGREE | |
|---|---|
| AS3 = | -0.0043243 λ rms |
| COMA3 = | -0.0000682 λ rms |

| LENS TILT PROPERTIES OF ASTIGMATISM AND COMMA ABERRATION UNDER LENS TILT ANGLE 0.3 DEGREE | |
|---|---|
| AS3 = | -0.0038915 λ rms |
| COMA3 = | -0.0332883 λ rms |

| DISC TILT PROPERTIES OF ASTIGMATISM AND COMMA ABERRATION UNDER DISC TILT ANGLE 0.3 DEGREE | |
|---|---|
| AS3 = | 0.0002815 λ rms |
| COMA3 = | 0.0331042 λ rms |

FIG. 12

LENS DATA OF SECOND EMBODIMENT OF PRESENT INVENTION, THICKNESS OF TRANSPARENT BOARD = 0.075 mm, OBJECT DISTANCE = -271.4195 mm, TEMPERATURE 25 °C

| SURFACE | RADIUS OF CURVATURE (mm) | FACE-TO-FACE DISTANCE (mm) | REFRACTIVE INDEX |
|---|---|---|---|
| OBJECT | infinity | -271.4195 | |
| APERTURE | infinity | 0 | |
| OBJECTIVE LENS LIGHT SOURCE SIDE SURFACE | 0.9102334 | 1.666 | 1.53 |
| OBJECTIVE LENS DISC SIDE SURFACE | -1.538624 | 0.463231548 | |
| DISC SURFACE | infinity | 0.075 | 1.62 |
| IMAGE SURFACE | infinity | | |

| ASPHERIC FACTOR OF OBJECTIVE LENS LIGHT SOURCE SIDE SURFACE | |
|---|---|
| K | -0.5432763 |
| A4 | 0.0093330351 |
| A6 | -0.001488119 |
| A8 | 0.017264205 |
| A10 | -0.033023272 |
| A12 | 0.04218927 |
| A14 | -0.02719578 |
| A16 | 0.008799971 |

| ASPHERIC FACTOR OF OBJECTIVE LENS DISC SIDE SURFACE | |
|---|---|
| K | -29.11896 |
| A4 | 0.29523857 |
| A6 | -0.551135252 |
| A8 | 0.54537901 |
| A10 | -0.004993724 |
| A12 | -0.57661172 |
| A14 | 0.54220418 |
| A16 | -0.16604966 |

| APERTURE DIAMETER = φ2.4 mm | |
|---|---|
| SPHERICAL ABERRATION PROPERTY (FIELD ANGLE 0 DEGREE) | |
| TOTAL = | 0.0152768 λ rms |
| SA3 = | 0.0079444 λ rms |
| SA5 = | 0.0131846 λ rms |
| SA7 = | 0.0031290 λ rms |
| SA9 = | 0.0010772 λ rms |

| FIELD ANGLE PROPERTIES OF ASTIGMATISM AND COMMA ABERRATION UNDER FIELD ANGLE 0.3 DEGREE | |
|---|---|
| AS3 = | -0.0038227 λ rms |
| COMA3 = | -0.0244052 λ rms |

| LENS TILT PROPERTIES OF ASTIGMATISM AND COMMA ABERRATION UNDER LENS TILT ANGLE 0.3 DEGREE | |
|---|---|
| AS3 = | -0.0035496 λ rms |
| COMA3 = | -0.0481352 λ rms |

| DISC TILT PROPERTIES OF ASTIGMATISM AND COMMA ABERRATION UNDER DISC TILT ANGLE 0.3 DEGREE | |
|---|---|
| AS3 = | 0.0002042 λ rms |
| COMA3 = | 0.0236259 λ rms |

FIG.13

LENS DATA OF SECOND EMBODIMENT OF PRESENT INVENTION, THICKNESS OF TRANSPARENT BOARD = 0.100 mm, OBJECT DISTANCE = 184.573 mm, TEMPERATURE 65 °C

| SURFACE | RADIUS OF CURVATURE (mm) | FACE-TO-FACE DISTANCE (mm) | REFRACTIVE INDEX |
|---|---|---|---|
| OBJECT | Infinity | 184.573 | |
| APERTURE | Infinity | 0 | |
| OBJECTIVE LENS LIGHT SOURCE SIDE SURFACE | 0.9102334 | 1.666 | 1.5267 |
| OBJECTIVE LENS DISC SIDE SURFACE | -1.536624 | 0.473130385 | |
| DISC SURFACE | Infinity | 0.1 | 1.6167 |
| IMAGE SURFACE | Infinity | | |

| ASPHERIC FACTOR OF OBJECTIVE LENS LIGHT SOURCE SIDE SURFACE | |
|---|---|
| K | -0.5432783 |
| A4 | 0.009330351 |
| A6 | -0.001488119 |
| A8 | 0.017264205 |
| A10 | -0.033023272 |
| A12 | 0.04218927 |
| A14 | -0.027719578 |
| A16 | 0.006799971 |

| ASPHERIC FACTOR OF OBJECTIVE LENS DISC SIDE SURFACE | |
|---|---|
| K | -29.11896 |
| A4 | 0.29523857 |
| A6 | -0.55135252 |
| A8 | 0.54537901 |
| A10 | -0.004393724 |
| A12 | -0.57661172 |
| A14 | 0.54220418 |
| A16 | -0.16604966 |

APERTURE DIAMETER = φ2.4 mm

| SPHERICAL ABERRATION PROPERTY (FIELD ANGLE 0 DEGREE) | |
|---|---|
| TOTAL = | 0.0192981 λ rms |
| SA3 = | -0.0061586 λ rms |
| SA5 = | -0.0173190 λ rms |
| SA7 = | -0.0075717 λ rms |
| SA9 = | -0.0022711 λ rms |

| FIELD ANGLE PROPERTIES OF ASTIGMATISM AND COMMA ABERRATION UNDER FIELD ANGLE 0.3 DEGREE | |
|---|---|
| AS3 = | -0.0045963 λ rms |
| COMA3 = | -0.0115194 λ rms |

| LENS TILT PROPERTIES OF ASTIGMATISM AND COMMA ABERRATION UNDER LENS TILT ANGLE 0.3 DEGREE | |
|---|---|
| AS3 = | -0.0041621 λ rms |
| COMA3 = | -0.0203038 λ rms |

| DISC TILT PROPERTIES OF ASTIGMATISM AND COMMA ABERRATION UNDER DISC TILT ANGLE 0.3 DEGREE | |
|---|---|
| AS3 = | 0.0002693 λ rms |
| COMA3 = | 0.0316955 λ rms |

OBJECTIVE LENS

BACKGROUND OF THE INVENTION (1) Field of the Invention

The present invention relates to a general purpose objective lens and an optical pickup device usable in a recording and reproducing apparatus which can correspond to an optical recording medium, for example, a compact disc (CD: including CD such as CD-R and the like), a digital versatile disc (DVD), a Blu-ray Disc™, an HDDVD and the like.

More particularly, the present invention relates to an objective lens and an optical pickup device recording and reproducing at a high numerical aperture such as the Blu-ray Disc™ or the like.

(2) Description of Related Art

Conventionally, as the objective lens of the optical pickup for the CD and the DVD, a plastic single lens is used mainly. In a standard specification of the Blu-ray Disc™ corresponding to a next generation DVD (a digital versatile disc), the NA is defined as 0.85, and a glass or plastic single lens is generally used.

However, if it is intended to achieve the high NA by the single plastic lens mentioned above, a spherical aberration is significantly generated in a beam spot caused by a temperature change, for example, a change amount of the spherical aberration comes to about 80 mλrms in 15° C. change in the plastic objective lens having a focal distance 1.41 mm, and goes beyond 70 mλrms corresponding to Marechal's critical value. Since the NA is about between 0.60 and 0.67 in the conventional DVD, the spherical aberration amount generated by the temperature change is comparatively small, and it is not necessary to cancel the spherical aberration. However, in the lens having the high NA equal to or higher than 0.81, the spherical aberration becomes in proportion to the fourth power of the NA, and the spherical aberration amount generated by the temperature change becomes large. Accordingly, it is necessary to cancel the spherical aberration generated by the temperature change.

In this case, if the glass lens is used, the spherical aberration caused by the temperature change comes to about some tenth of the plastic lens and does not appear, however, there is a problem that a productivity is inferior with a high cost. Accordingly, it is desired to apply the plastic objective lens to the Blu-ray Disc™.

Then, there has been conventionally proposed a method of canceling a spherical aberration of an objective lens generated at a time of a temperature change, by moving a collimate lens in an optical pickup optical system, as described in patent document 1 (JP-A-2008-4169).

The Blu-ray Disc™ has two kinds of discs including a single-layer one and a two-layer one. The single-layer disc has a single recording layer and a thickness of a transparent board thereof is 0.100 mm, and the two-layer disc has two recording layers and thicknesses of respective transparent boards thereof are defined to 0.075 mm and 0.100 mm by a standard specification. In the case of the two-layer disc, a great spherical aberration about 0.25 λrms is generated by a difference 0.025 mm of the board thicknesses, however, the spherical aberration is compensated by moving a collimator lens or a beam expander so as to change a state of a light beam incoming to the objective lens to a parallel light incoming radiation or a divergent light incoming from a convergent light incoming, thereby recording or reproducing each of the layers.

Since a so-called object distance as seen from the objective lens is changed by compensating the difference between the spherical aberrations in the two-layer disc and the spherical aberration of the plastic objective lens at a time of the temperature change, by means of the optical system mentioned above, a field angle property (an image height property) of the objective lens is changed. In general, in the objective lens corresponding to the two-layer disc, it is designed at a thickness 0.875 mm corresponding to an intermediate thickness of the two-layer disc. However, if so, the field angle property under a certain condition does not come to a desirable value, and a lens tilt property mentioned below does not come to a desirable value. This matter is in detail described below on the basis of comparative examples in FIGS. 4 to 7.

In the pickup optical system, in order to prevent the aberration of the pickup optical system from fluctuating even at a time when the objective lens moves in a vertical direction to an optical axis at a time of a tracing servo, the incoming light to the objective lens is set to the parallel light, that is, the object distance for the objective lens is set to ∞, particularly in the case that the numerical aperture (NA) is large. Accordingly, in the case of the objective lens for the Blu-ray Disc™ corresponding to the two-layer disc having the thicknesses 0.075 mm and 0.100 mm of the transparent boards, there can be considered to set a ∞ objective lens at 0.0875 mm corresponding to the intermediate disc thickness. By using the lens mentioned above, for example, it is possible to set the incoming light to the objective lens to the convergent light in the case that the thickness of the transparent board is 0.075 mm, set the incoming light to the objective lens to the divergent light in the case that the thickness of the transparent board is 0.100 mm, and make shift degrees of the convergent light and the divergent light from the parallel light approximately identical. Therefore, it is possible to record or reproduce in a good wave aberration state in each of the recording layers.

FIG. 1 shows an example of a typical pickup optical system using a plastic objective lens for a Blu-ray Disc™ corresponding to a two-layer disc having thicknesses 0.075 mm and 0.100 mm. A laser light radiated from a semiconductor laser 1 incomes to a collimator lens 2 so as to form a parallel light, and incomes to an objective lens 4 via an aperture limiting member 3, and the laser light focuses on an information recording surface (not shown) of an optical disc 5 corresponding to the Blu-ray Disc™. In this case, a reflecting member such as a reflecting mirror or the like and a prism are omitted in this drawing, and beams of light are expressed by being linearized.

A semiconductor laser 8 serving as a laser light source emits a laser light in a bluish violet band pass (405 nm) in accordance with a standard specification of the Blu-ray Disc™. The collimator lens 2 is installed at a position at which the laser light emitted from the semiconductor laser 1 and existing in an optical path of the laser light goes forward as a divergent light, and corresponds to a plus lens refracting the laser light in such a manner as to be converted into the parallel light from the divergent light in the case that the collimator lens exists at a standard position. The collimator lens 2 is held by a collimator lens actuator (not shown) in such a manner as to be moved forward and backward and be regulated its position only in a direction of an optical axis (that is, a direction of a beam axis of the laser light emitted from the semiconductor laser 1). The objective lens 4 is a focusing lens (a plus lens) focusing the laser light transmitting the collimate lens 2 on a recording layer of the optical disc 5. The objective lens 7 is a plastic single lens formed in accordance with a standard specification of the Blu-ray Disc™. Accordingly, a numerical aperture (NA) thereof is 0.85.

In this case, a description will be given of a case of the objective lens of the parallel light incoming (∞ system) in which the thickness of the transparent board is 0.0875 mm. A focal distance is 1.411765 mm in a state of 25° C. Data of the objective lens and a calculation result of the wave aberration are shown in FIG. 4. In this case, meanings of respective symbols in FIG. 4 are as follows.

SA3: third order spherical aberration
SA5: fifth order spherical aberration
SA7: seventh order spherical aberration
SA9: ninth order spherical aberration
AS3: third order astigmatism
COMA3: third order comma aberration.

Further, the field angle property in the case that the angle of field is 0.3 degree expresses a property at a time when the light having an angle 0.3 degree with respect to the optical axis incomes to the objective lens, the lens tilt property in the case that the angle of lens tilt is 0.3 degree expresses the wave aberration property at a time when the objective lens is tilted at 0.3 degree, and the disc tilt property in the case that the angle of the disc tilt is 0.3 degree expresses the wave aberration property at a time when the objective lens is tilted at 0.3 degree. In this case, a refractive index of the objective lens is 1.53 as shown in FIG. 4, and this is a refractive index in the case of 25° C. at 405 nm. Further, a temperature property of a change amount of the refractive index is −0.00011/° C. In general, the temperature property of the change amount of the refractive index of the plastic for lens is about −0.0001/° C. to −0.00012/° C. Further, the refractive index of the transparent board of the disc is 1.62, and the temperature property of the change amount of the refractive index is −0.00011/° C.

In the objective lens shown in FIG. 4, under this state, that is, under a state in which the thickness of the transparent board of the disc is 0.0875 mm at 25° C., the COMA3 at a time when the lens tilt is 0.3 degree is −0.0286347 λRMS, and the COMA3 at a time when the disc tilt is 0.3 degree is −0.0285179 λRMS, they are approximately equal to each other. In this case, since the COMA3 in the case that the angle of field is 0.3 degree is −0.0000035 λRMS and is almost close to zero, and is designed in a state of keeping a so-called sine condition, the COMA3 at a time of the disc tilt is equal to the COMA3 at a time of the lens tilt. In this state, if the objective lens tilt is carried out, for example, at a time of recording or reproducing the tilted disc or the surface shift disc, that is, if the objective lens is set to a tilted state with respect to the optical axis by using the tilt actuator or the like, the COMA3 in the disc tilt and the COMA3 in the lens tilt cancel with each other so as to achieve a good wave aberration state as a whole of the good pickup optical system.

For example, in the case that the COMA3 of the lens tilt is generated only one half of the COMA3 in the disc tilt, the COMA3 is not canceled until the lens tilt is carried out at 1.0 degree in the case that the disc tilt is 0.5 degree. Accordingly, it is necessary to secure a dynamic range of the lens tilt sufficiently large, and it is necessary to take into consideration a structure and a dimension of the optical pickup such that no problem is generated by carrying out a great amount of lens tilt. Therefore, there is generated a defect that the optical pickup is enlarged in size and a device is required in the tilt actuator mechanism.

FIG. 5 shows the lens data and the wave aberration property at a time of recording or reproducing the thicker disc of the two-layer disc or recording or reproducing the single-layer disc by using the objective lens, that is, at a time when the thickness of the transparent board is 0.100 mm, in the state of 25° C. In this case, the object distance for the objective lens comes to a state of 338.9928 mm. In other words, as shown in FIG. 3, the collimator lens 2 moves close to the laser side in comparison with the state in FIG. 1, by the collimate lens actuator constituted by a stepping motor and a piezo element, and the laser light incomes to the objective lens in a state of the divergent light.

FIG. 6 shows the lens data and the wave aberration property at a time of recording or reproducing the thinner disc of the two-layer disc, that is, at a time when the thickness of the transparent board is 0.075 mm, by using the objective lens in the state of 25° C. in the same manner. In this case, the object distance for the objective lens comes to a state of −323.9406 mm. In other words, as shown in FIG. 2, the collimator lens 2 moves close to the disc side in comparison with the state in FIG. 1, by the collimate lens actuator, and the laser light incomes to the objective lens in a state of the convergent light.

Next, FIG. 7 shows the lens data and the wave aberration property at a time of recording or reproducing the thicker disc of the two-layer disc or recording or reproducing the single-layer disc by using the objective lens, that is, at a time when the thickness of the transparent board is 0.100 mm, in a state of 55° C. The object distance for the objective lens comes to a state of 163.3295 mm, that is, the divergent light incomes. In this case, as shown in FIG. 7, the COMA3 at a time when the angle of field is 0.3 degree is 0.024932 λRMS, the COMA3 at a time when the lens tilt is 0.3 degree is −0.0077500 λRMS, and the COMA3 at a time when the disc tilt is 0.3 degree is 0.0325419 λRMS. In other words, there is established an expression (COMA3 at a time when angle of field is 0.3 degree)=(COMA3 at a time when lens tilt is 0.3 degree)+(COMA3 at a time when disc tilt is 0.3 degree), under a precision of 1% in the COMA3.

In this case, the COMA3 at a time when the lens tilt is 0.3 degree is only 0.238 times the COMA3 at a time when the disc tilt is 0.3 degree. In other words, when it is intended to cancel the COMA3 generated in the case that the disc tilt is 0.3 degree by the lens tilt, it is necessary to carry out the lens tilt at 1.260 degree. This matter causes such a defect that it is necessary to secure a space so as to carry out a lot of lens tilt, and the mechanism of the tilt actuator for the lens tilt becomes complicated. In other words, this problem is generated because a sensitivity of the COMA3 at a time of the lens tilt becomes lower, that is, 0.238 times a sensitivity of the COMA3 at a time of the disc tilt.

BRIEF SUMMARY OF THE INVENTION

An object of the present invention is to provide a plastic objective lens having a good lens tilt property in both thicknesses of a two-layer disc in a used temperature range even in the plastic objective lens in which a numerical aperture (NA) is equal to or higher than 0.81, while dissolving the problem mentioned above.

The present invention employs the following means for achieving the object mentioned above.

In other words, there is provided an objective lens for an optical pickup capable of recording or reproducing an optical information recording medium having a first layer recording layer with thin transparent board thickness t1 and a second recording layer with thick transparent board thickness t2, wherein the objective lens has a numerical aperture which is equal to or higher than 0.81, and is made of a plastic material, and the objective lens includes a point at which a third order comma aberration amount generated at a time of a lens tilt of the objective lens becomes equal to a third order comma aberration amount generated at a time when a disc is tilted at the same angle amount as the lens tilt angle, in a transparent board thickness of t2+Δt (Δt>0) under a room temperature (25±3° C.). Further, it is desirable that a relation 0.003≦Δt≦0.025 is satisfied.

Further, there is provided an optical pickup device comprising:

a semiconductor laser;

a collimator lens converting a divergent angle of a laser light incoming as a divergent light from the semiconductor laser; and an objective lens capable of focusing a laser light transmitting through the collimate lens on any recording layer of an optical information recording medium having a first layer recording layer with thin transparent board thickness t1 and a second recording layer with thick transparent board thickness t2, wherein the objective lens has a numerical aperture which is equal to or higher than 0.81, and is made of a plastic material, and the objective lens includes a point at which a third order comma aberration amount generated at a time of a lens tilt of the objective lens becomes equal to a third order comma aberration amount generated at a time when a disc is tilted at the same angle amount as the lens tilt angle, in a transparent board thickness of t2+Δt (Δt>0) under a room temperature (25±3° C.). Further, it is desirable that a relation 0.003≦Δt≦0.025 is satisfied.

In accordance with the present invention, it is possible to obtain the plastic objective lens having the good lens tilt property even in both thicknesses of the two-layer disc in the used temperature range even in the plastic objective lens having the NA equal to or higher than 0.81.

BRIEF DESCRIPTION OF THE SEVERAL VIEWS OF THE DRAWINGS

FIG. 4 shows a lens data and a wave aberration property calculation value at a time when a temperature is 25° C. and a transparent board thickness is 0.0875 mm in a comparative example;

FIG. 5 shows a lens data and a wave aberration property calculation value at a time when a temperature is 25° C. and a transparent board thickness is 0.100 mm in a comparative example;

FIG. 6 shows a lens data and a wave aberration property calculation value at a time when a temperature is 25° C. and a transparent board thickness is 0.075 mm in a comparative example;

FIG. 7 shows a lens data and a wave aberration property calculation value at a time when a temperature is 55° C. and a transparent board thickness is 0.100 mm in a comparative example;

FIG. 8 shows a lens data and a wave aberration property calculation value at a time when a temperature is 25° C. and a transparent board thickness is 0.1125 mm in a first embodiment in accordance with the present invention;

FIG. 9 shows a lens data and a wave aberration property calculation value at a time when the temperature is 25° C. and the transparent board thickness is 0.075 mm in the first embodiment in accordance with the present invention;

FIG. 10 shows a lens data and a wave aberration property calculation value at a time when the temperature is 55° C. and the transparent board thickness is 0.100 mm in the first embodiment in accordance with the present invention;

FIG. 11 shows a lens data and a wave aberration property calculation value at a time when a temperature is 25° C. and a transparent board thickness is 0.103 mm in a second embodiment in accordance with the present invention;

FIG. 12 shows a lens data and a wave aberration property calculation value at a time when the temperature is 25° C. and the transparent board thickness is 0.075 mm in the second embodiment in accordance with the present invention; and FIG. 13 shows a lens data and a wave aberration property calculation value at a time when the temperature is 55° C. and the transparent board thickness is 0.100 mm in the second embodiment in accordance with the present invention.

DETAILED DESCRIPTION OF THE INVENTION

Figure 1:
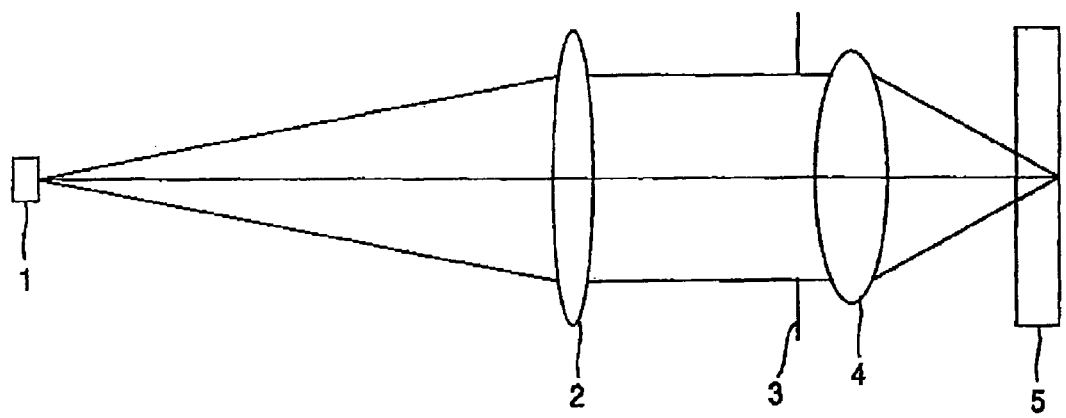
FIG. 1 is a view showing a blue ray pickup optical system mounting an objective lens thereon and a view in the case that an incoming light to the objective lens is constituted by a parallel light.
Figure 2:
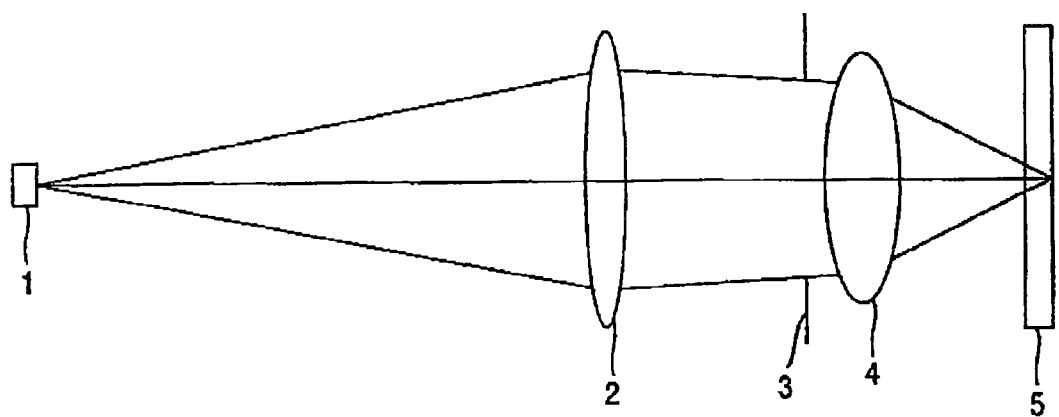
FIG. 2 is a view showing the blue ray pickup optical system mounting the objective lens thereon and a view in the case that the incoming light to the objective lens is constituted by a convergent light.
Figure 3:
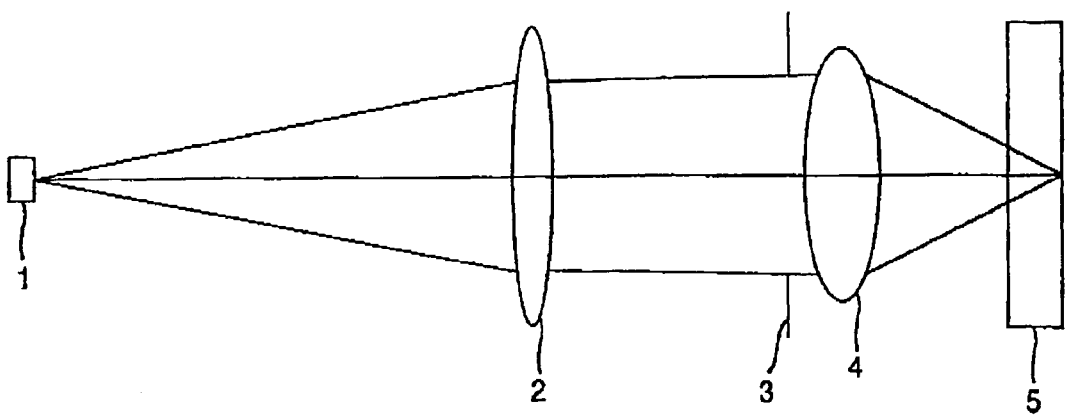
FIG. 3 is a view showing the blue ray pickup optical system mounting the objective lens thereon and a view in the case that the incoming light to the objective lens is constituted by a divergent light.

A description will be given below of embodiments of an objective lens and an optical pickup device in accordance with the present invention with reference to the accompanying drawings. FIG. 1 shows an example of a pickup optical system corresponding to a two-layer disc having thicknesses 0.075 mm and 0.100 mm.

A laser light radiated from a semiconductor laser 1 incomes to a collimator lens 2 so as to form a parallel light, and incomes to an objective lens 4 via an aperture limiting member 3, and the laser light focuses on an information recording surface (not shown) of an optical disc 5 corresponding to the Blu-ray Disc™. In this case, a reflecting member such as a reflecting mirror or the like and a prism are omitted in this drawing, and beams of light are expressed by being linearized.

A semiconductor laser 8 serving as a laser light source emits a laser light in a bluish violet band pass (405 nm) in accordance with a standard specification of the Blu-ray Disc™. The collimator lens 2 is installed at a position at which the laser light emitted from the semiconductor laser 1 and existing in an optical path of the laser light goes forward as a divergent light, and corresponds to a plus lens refracting the laser light in such a manner as to be converted into the parallel light from the divergent light in the case that the collimator lens exists at a standard position. The collimator lens 2 is held by a collimator lens actuator (not shown) in such a manner as to be moved forward and backward and be regulated its position only in a direction of an optical axis (that is, a direction of a beam axis of the laser light emitted from the semiconductor laser 1). The objective lens 4 is a focusing lens (a plus lens) focusing the laser light transmitting the collimate lens 2 on a recording layer of the optical disc 5. The objective lens 7 is a plastic single lens formed in accordance with a standard specification of the Blu-ray Disc™. Accordingly, a numerical aperture (NA) thereof is 0.85.

Embodiment 1

FIG. 8 shows a lens data of a first embodiment in accordance with the present invention. A refractive index of the objective lens is 1.53 and a focal distance is 1.411765 mm under a temperature 25° C. Since the present first embodiment is designed in such a manner as to satisfy a sine condition at an objective distance 168.0415 mm at a transparent board thickness 0.1125 mm (Δt=0.0125) at the temperature 25° C., under a state shown in FIG. 8, a COMA3 at a time when an angle of field is 0.3 degree is −0.0001599 λRMS, which is approximately close to zero. Accordingly, a COMA3 at a time of a lens tilt comes to −0.0360326 λRMS, which is approximately equal to 0.035763 λRMS at a time of a disc tilt.

FIG. 10 shows a state in which the transparent board thickness is 0.100 mm, and the temperature is 55° C. The wave aberration at the field angle 0 degree becomes minimum in the divergent light incoming at the objective distance 151.1078 mm. The COMA3 at a time when the angle of field is 0.3 degree is 0.0035897 λRMS. Since the COMA3 at a time of the lens tilt 0.3 degree is −0.0276034 λRMS and that at a time of the disc tilt 0.3 degree is 0.0311321 λRMS, an absolute value of the COMA3 at a time of the lens tilt 0.3 degree is 0.887 times an absolute value of the COMA3 at a time of the disc tilt. Since this value is 0.238 times in the comparative example, an effect of the present invention appears. In this case, a value of a radius of curvature, an aspheric factor and a center thickness are changed on the basis of a coefficient of linear expansion of the plastic material, at the temperature 55° C., however, the wave aberration value is only slightly affected thereby. Accordingly, only the wave aberration value affected by the change of the refractive index is calculated.

In this case, in a state in which the transparent board thickness is 0.075 mm and the temperature is 25° C. shown in FIG. 9, the COMA3 at a time when the lens tilt is 0.3 degree is −0.056093 λRMS, and that at a time when the disc tilt is 0.3 degree is 0.0232293 λRMS. Accordingly, the absolute value of the COMA3 at a time when the lens tilt is 0.3 degree comes to 2.415 times the absolute value of the COMA3 at a time when the disc tilt is 0.3 degree, and a comparatively good value is kept. In the case that the sensitivity of the COMA3 at a time of the lens tilt is in trouble due to its too highness, the structure may be made, for example, as the following second embodiment. In the second embodiment, it is reduced to 2.037 times as mentioned below.

Embodiment 2

FIG. 11 shows a lens data of a second embodiment in accordance with the present invention. A refractive index of the objective lens is 1.53 and a focal distance is 1.411765 mm under a temperature 25° C. Since the present second embodiment is designed in such a manner as to satisfy a sine condition at an objective distance 300 mm at a transparent board thickness 0.103 mm (Δt=0.003) at the temperature 25° C., under a state shown in FIG. 11, a COMA3 at a time when an angle of field is 0.3 degree is −0.0000682 λRMS, which is approximately close to zero. Accordingly, a COMA3 at a time of a lens tilt comes to −0.0332883 λRMS, which is approximately equal to 0.0331042 λRMS at a time of a disc tilt.

FIG. 13 shows a state in which the transparent board thickness is 0.100 mm, and the temperature is 55° C. The wave aberration at the field angle 0 degree becomes minimum in the divergent light incoming at the objective distance 164.573 mm. The COMA3 at a time when the angle of field is 0.3 degree is 0.0115194 λRMS. Since the COMA3 at a time of the lens tilt 0.3 degree is −0.0203038 λRMS and that at a time of the disc tilt 0.3 degree is 0.0316955 λRMS, an absolute value of the COMA3 at a time of the lens tilt 0.3 degree is 0.641 times an absolute value of the COMA3 at a time of the disc tilt. Since this value is 0.238 times in the comparative example, an effect of the present invention appears. In this case, in a state in which the transparent board thickness is 0.075 mm and the temperature is 25° C. shown in FIG. 12, the COMA3 at a time when the lens tilt is 0.3 degree is −0.0481352 λRMS, and that at a time when the disc tilt is 0.3 degree is 0.0236259 λRMS. Accordingly, the absolute value of the COMA3 at a time when the lens tilt is 0.3 degree comes to 2.037 times the absolute value of the COMA3 at a time when the disc tilt is 0.3 degree, and is reduced in comparison with the first embodiment.

In the case of a larger thickness than 0.1125 mm in the first embodiment, for example, in the case of preventing the COMA3 in the field angle property from appearing at 0.125 mm (Δt=0.025) and at 25° C., it is possible to estimate that the absolute value of the COMA3 at a time when the lens tilt is 0.3 degree becomes about three times the absolute value of the COMA3 at a time when the disc tilt is 0.3 degree, in a state in which the transparent board thickness is 0.075 mm and the temperature is 25° C., on the basis of a relation between the first embodiment 0.1125 mm and the second embodiment 0.103 mm. In this case, the sensitivity of the COMA3 at a time of the lent tilt becomes higher in accordance that the board thickness becomes thinner or the temperature becomes lower. For example, the higher sensitivity than the sensitivity mentioned above is obtained at a time of being used at 5° C. or 9° C. Putting this matter together, it is considered to be a limit to prevent the COMA3 in the field angle property from appearing at the transparent board thickness 0.125 mm and at 25° C. In this case, since it is possible to estimate that the absolute value of the COMA3 at a time when the lens tilt is 0.3 degree is about 1.1 times the absolute value of the COMA3 at a time when the disc tilt is 0.3 degree, at the transparent board thickness 0.100 mm and at 55° C., a sufficient lens tilt sensitivity is provided.

In the present invention, 0.003≦Δt is defined, however, if going beyond this lower limit, the good lens tilt property can not be obtained in a deeper layer (t=0.100 mm) from the disc surface in the case that the used environment temperature of the pickup rises. In other words, since the lens tilt sensitivity is too low, the comma of the disc tilt can not be compensated until enlarging the tilt angle. On the other hand, Δt≦0.025 is defined, however, if going beyond the upper limit, the good lens tilt characteristic can not be obtained in a shallower layer (t=0.075 mm) from the disc surface in the case that the used environment temperature of the pickup is lowered. In other words, since the lens tilt sensitivity is too high, it is hard to control the tilt actuator. In this case, taking the reasons mentioned above into consideration, it is desirable that the upper limit of Δt is within 0.015.

As mentioned above, in the embodiments in accordance with the present invention, the good sensitivity of the COMA3 of the lens tilt can be obtained.

The invention claimed is:

1. An objective lens for an optical pickup capable of recording or reproducing an optical information recording medium having a first layer recording layer with thin transparent board thickness t1 and a second recording layer with thick transparent board thickness t2, wherein the objective lens has a numerical aperture which is equal to or higher than 0.81, and is made of a plastic material, and the objective lens includes a point at which a third order comma aberration amount generated at a time of a lens tilt of said objective lens becomes equal to a third order comma aberration amount generated at a time when a disc is tilted at the same angle amount as said lens tilt angle, in a transparent board thickness of t2+Δt (Δt>0) under a room temperature (25±3° C.).

2. An objective lens as claimed in claim 1, wherein a relation 0.003 mm≦Δt≦0.025 mm is satisfied.

3. An optical pickup device comprising:
   a semiconductor laser;

a collimator lens converting a divergent angle of a laser light incoming as a divergent light from said semiconductor laser; and an objective lens capable of focusing a laser light transmitting through said collimate lens on any recording layer of an optical information recording medium having a first layer recording layer with thin transparent board thickness t1 and a second recording layer with thick transparent board thickness t2, wherein said objective lens has a numerical aperture which is equal to or higher than 0.81, and is made of a plastic material, and the objective lens includes a point at which a third order comma aberration amount generated at a time of a lens tilt of said objective lens becomes equal to a third order comma aberration amount generated at a time when a disc is tilted at the same angle amount as said lens tilt angle, in a transparent board thickness of $t2+\Delta t$ ($\Delta t>0$) under a room temperature ($25\pm3°$ C.).

4. An optical pickup device as claimed in claim 3, wherein a relation $0.003 \text{ mm} \leqq \Delta t \leqq 0.025 \text{ mm}$ is satisfied.

* * * * *